W. H. HOPE.
MACHINE FOR CUTTING MARKINGS ON SCALE BEAMS.
APPLICATION FILED SEPT. 9, 1918.

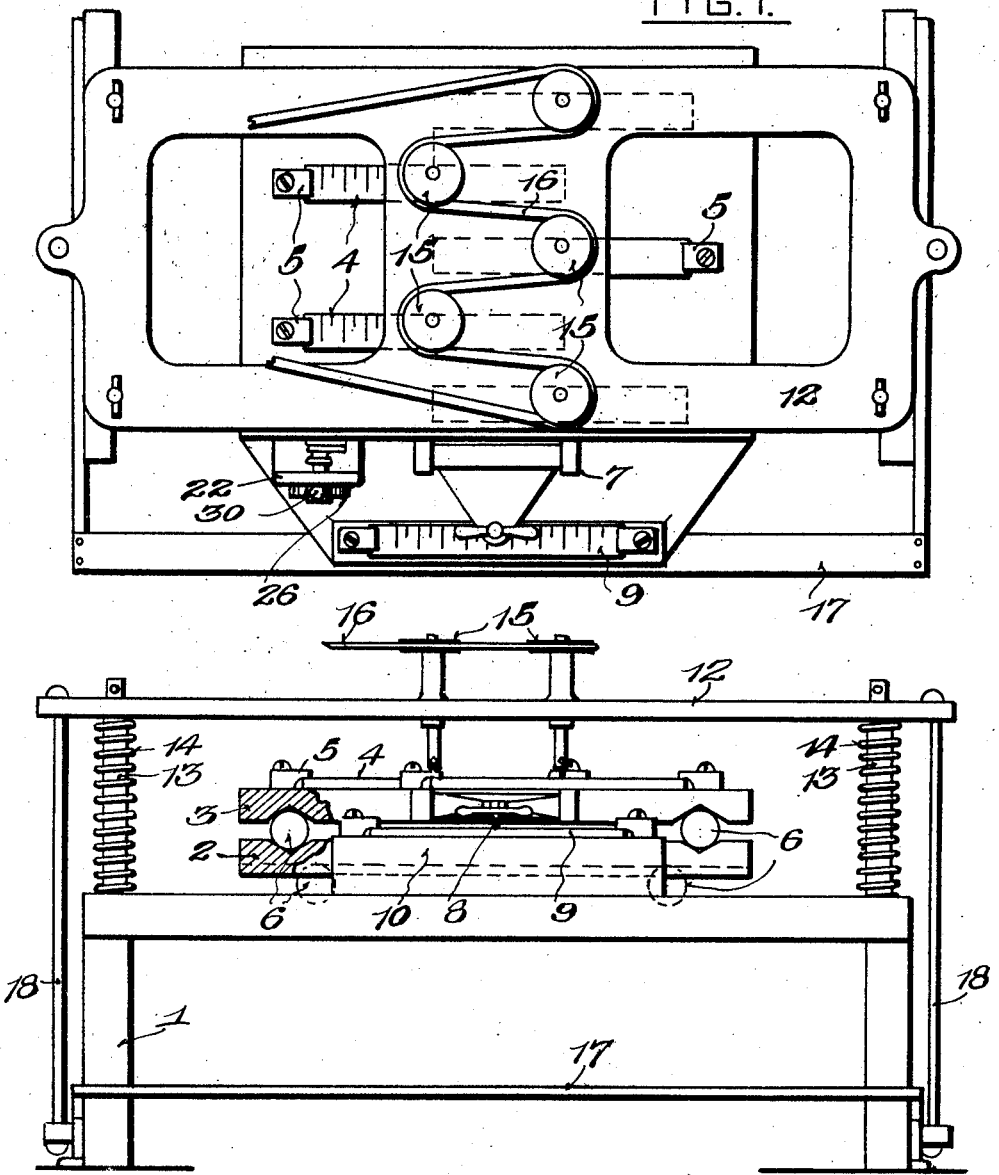

1,321,637.

Patented Nov. 11, 1919.
2 SHEETS—SHEET 2.

INVENTOR.
William H. Hope
Joseph A. Miller
ATTORNEY.

UNITED STATES PATENT OFFICE.

WILLIAM H. HOPE, OF PROVIDENCE, RHODE ISLAND.

MACHINE FOR CUTTING MARKINGS ON SCALE-BEAMS.

1,321,637.  Specification of Letters Patent.  Patented Nov. 11, 1919.

Application filed September 9, 1918. Serial No. 253,285.

*To all whom it may concern:*

Be it known that I, WILLIAM H. HOPE, a citizen of the United States, residing at Providence, in the county of Providence and State of Rhode Island, have invented a new and useful Improvement in Machines for Cutting Markings on Scale-Beams, of which the following is a specification.

This invention relates to certain new and useful improvements in a machine for cutting markings on scale beams, and especially to a machine of the pantograph type embodying upper and lower carriages.

The principal object of the invention resides in an improved means for locking the two carriages together, which means embodies a feed mechanism for advancing the upper carriage on the lower carriage as the cutting of the markings proceeds.

The invention further resides in the features of construction and the arrangements and combinations of parts hereinafter described and claimed, the preferred embodiment being exemplified in the accompanying drawings wherein—

Figure 1 is a top plan view of the improved machine.

Fig. 2 is a front elevation of the machine partly in section.

Figure 3:
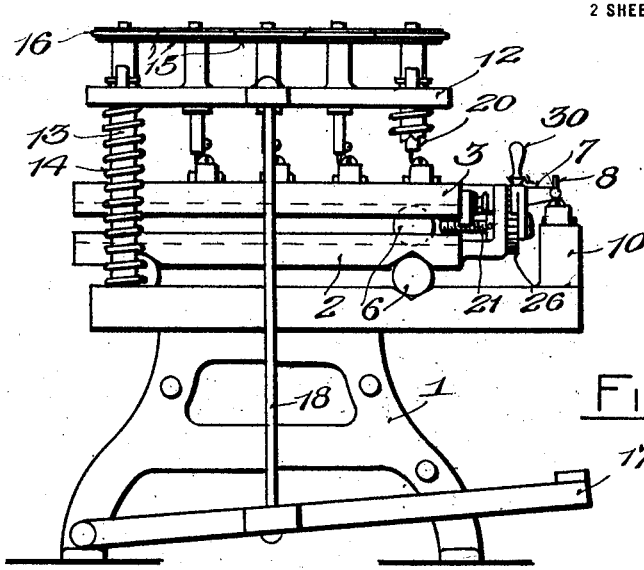
Fig. 3 is an end elevation of the same partly broken away.
Figure 4:
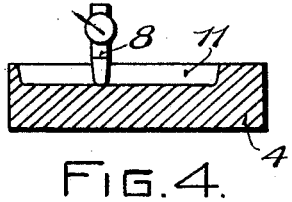
Fig. 4 is an enlarged transverse section through the pattern beam showing the stylus coöperating therewith.
Figure 5:
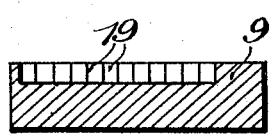
Fig. 5 is a similar view through a scale beam illustrating the finished markings.
Figure 8:
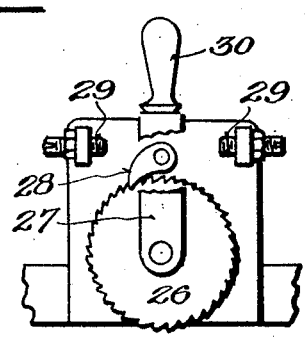
Fig. 8 is a detailed elevation of the manual pawl and ratchet operating means of the feed mechanism.

Referring more in detail to the drawings, the numeral 1 designates the frame of the machine having the lower carriage 2 supporting the upper or work carriage 3 on which are secured the scale beams 4 by means of a pair of clamps 5 and tightening screws. Ball bearings 6 operate in races, provided in the opposing faces of the two carriages and bed of the machine, and thus support the upper carriage for universal movement.

To the forward edge of the work carriage is hinged the stylus-carrying frame or arm 7 in the free outer end of which is mounted the stylus 8, as is usual in pantographs. The pattern beam 9 is fixedly secured to an upstanding table or ledge 10 on the bed of the frame 1 to underlie the stylus 8 and is provided with beveled grooves 11 constituting guide lines which correspond to the desired markings to be cut on the scale beams.

The cutters are rotatably journaled in a tool carriage 12 which is guided for vertical movement by the rods 13, encircling springs 14 being provided for extending the rods to thereby hold the tool carriage normally in an inoperative position. Any number of cutters may be provided, the same being arranged in staggered relation and are equipped with pulleys 15 between which the driving belt 16 winds, as is depicted in Fig. 1. By this arrangement the cutters are divided into spaced sets, those of one set being driven in a reverse direction from those of the companion set. In view of this arrangement, it is necessary that the scale beams should also be staggered as shown.

Figures 6, 7:
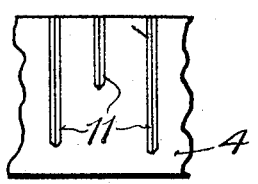
Fig. 6 is an enlarged top plan view, in fragment, of the pattern beam, depicting the guide grooves for the line markings.
Fig. 7 is a similar plan view illustrating the manner in which the cutters operate to form a line or marking.

In practice, the operator places the stylus in the desired guide groove 11 and depresses the foot lever 17 which is connected to the tool carriage through the links 18. This will result in a lowering of the tool carriage and the cutters will thus be brought into working contact with the scale beams 4 for drilling a single hole in each. When drilled to the desired depth, the pressure on the foot lever is released for permitting the springs to raise the cutters 20 from the work, after which the upper carriage is moved inwardly or backwardly a distance sufficient to present a new portion of the scale beams to the cutters following which the tool carriage is again lowered, such operation being continued throughout the length of the line on the pattern. The resulting holes are made to overlap each other, as shown on an exaggerated scale in Fig. 7, forming one continuous line 19, the slightly roughened edges of which are especially adapted for receiving the enamel filling that is usually applied to such markings, though not necessarily so.

The mechanism for feeding or moving the work carriage on the lower carriage consists of a screw-threaded shaft 21, journaled in an upturned bracket 22 carried by the lower carriage, and a coöperating half nut 23 which is pivoted at 24 to the forward edge of the upper carriage and adapted to be swung into and out of mesh with the threads of the screw shaft. The half nut is equipped with a spring-projected latch or pin 25 for entering in a socket or recess in the carriage 3 to lock the nut and shaft in intermeshing relation. When it is desired to release one carriage from the other the half nut is swung back to the dotted line position where it is supported by a stop pin.

On the outer end of the screw shaft is fixed a ratchet 26 and pivotally connected therewith is an operating lever 27 which carries a pawl 28 for engaging the teeth of said ratchet. A pair of screw stops 29 are adjustably mounted on the bracket 22 on opposite sides of the lever for limiting the swing thereof and consequently the amount of feed of the upper carriage.

Figure 10:
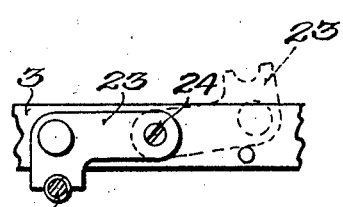
Fig. 10 is a transverse section illustrating the half nut employed in the feed mechanism.
Figure 9:
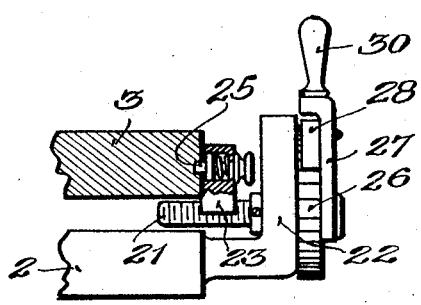
Fig. 9 is a side elevation partly in section of the feed mechanism.

In operation, the operator, after properly setting or adjusting the machine depresses the pedal 17 causing the first drilling in the formation of lines 19. He then swings the handle 30 of lever 27 which operates the ratchet, causing a predetermined inward movement of the top bed to which the scale beams are secured after which the operator again depresses the pedal, drilling another series of holes in the lines 19 and so continues the action until each of the lines whether long or short is properly marked. After this has been accomplished and it is desirous of marking figures, letters or similar characters on the beam, the half nut latch or pin is withdrawn and the half nut is swung back into the position shown in broken lines (Fig. 10) when the machine is in condition to be operated as a pantograph by the stylus point.

Having thus described my invention, what I claim as new and desire to secure by Letters Patent is—

1. A machine for cutting markings on scale beams, comprising upper and lower carriages, a bed supporting the same, means for holding a pattern on the bed, means for holding scale beams on the upper carriage, a stylus carried by the latter for tracing the pattern, cutting means for acting upon the scale beams and beneath which the upper carriage is movable, and feed mechanism detachably locking the two carriages together and consisting of a bracket carried by the lower carriage, a screw shaft journaled in the bracket and extending beneath the upper carriage, a half nut member pivoted to the upper carriage for swinging into mesh with the shaft, a ratchet fixed on the outer end of the shaft, a lever carrying a pawl coöperating with the ratchet to rotate the shaft, and adjustable stop means for limiting the throw of the lever.

2. A machine for cutting markings on scale beams, comprising upper and lower carriages, a bed supporting the same, means for holding a pattern on the bed, means for holding scale beams on the upper carriage, a stylus carried by the latter for tracing the pattern, cutting means for acting upon the scale beams and beneath which the upper carriage is movable and feed mechanism detachably locking the two carriages together and consisting of a bracket carried by the lower carriage, a screw shaft journaled in the bracket and extending beneath the upper carriage, a half nut member pivoted to the upper carriage for swinging into mesh with the shaft, a ratchet fixed on the outer end of the shaft and a lever carrying a pawl coöperating with the ratchet to rotate the shaft.

3. A machine for cutting markings on scale beams, comprising upper and lower carriages, a bed supporting the same, means for holding a pattern on the bed, means for holding scale beams on the upper carriage, a stylus carried by the latter for tracing the pattern, cutting means for acting upon the scale beams and beneath which the upper carriage is movable, and feed mechanism locking the two carriages together for quick release and consisting of a screw shaft carried by one carriage and a coöperating swingingly mounted nut member on the other carriage and engageable with the screw shaft.

4. A pantograph embodying a bed, a lower carriage supported thereon for free and guided movement in one direction, an upper carriage supported on the lower carriage for free and guided movement at an angle to the path of movement of the first carriage, a stylus carried on the upper carriage, a feed screw carried by the lower carriage, and means for establishing quick engagement of the screw with the upper carriage for imparting restricted and predetermined movement to the upper carriage.

5. In a pantograph machine, upper and lower carriages, a feed screw carried by one, a coöperable nut carried by the other and mounted thereon for relative movement to be readily disengaged from the screw, and quickly releasable means for positively holding the nut in engagement with the screw and against relative movement on its supporting carriage.

6. In a machine for cutting markings on scale beams, comprising means for cutting rows of recesses in the scale beams as the latter are moved intermittently therebeneath, a carriage for holding the scale beams movably supported beneath the cutting means, means for adjusting the carriage beneath the cutting means including a feed screw and a coöperating nut, one of the two last named elements carried by the carriage, manually operable means for turning the screw predetermined degrees, and adjustable means for predetermining the degree of turn of said screw by said manually operable means.

In testimony whereof I have signed my name to this specification in the presence of two subscribing witnesses.

WILLIAM H. HOPE.

Witnesses:
ADA E. HAGERTY,
J. A. MILLER.

Copies of this patent may be obtained for five cents each, by addressing the "Commissioner of Patents, Washington, D. C."